US012083853B2

(12) United States Patent
Yeon et al.

(10) Patent No.: US 12,083,853 B2
(45) Date of Patent: Sep. 10, 2024

(54) HEATING, VENTILATION, AND AIR CONDITIONING SYSTEM FOR VEHICLE

(71) Applicants: Hyundai Motor Company, Seoul (KR); Kia Corporation, Seoul (KR); Hanon Systems, Daejeon (KR)

(72) Inventors: Dong Won Yeon, Daejeon (KR); Seok Jun Oh, Gwacheon-Si (KR); Jeong Woong Son, Seoul (KR); In Keun Kang, Daejeon (KR)

(73) Assignees: Hyundai Motor Company, Seoul (KR); Kia Corporation, Seoul (KR); Hanon Systems, Daejeon (KR)

( * ) Notice: Subject to any disclaimer, the term of this patent is extended or adjusted under 35 U.S.C. 154(b) by 0 days.

(21) Appl. No.: 17/974,273

(22) Filed: Oct. 26, 2022

(65) Prior Publication Data

US 2023/0173869 A1    Jun. 8, 2023

(30) Foreign Application Priority Data

Dec. 2, 2021    (KR) .......................... 10-2021-0171084

(51) Int. Cl.
*B60H 1/00*    (2006.01)
(52) U.S. Cl.
CPC ..... *B60H 1/00064* (2013.01); *B60H 1/00514* (2013.01); *B60H 2001/00135* (2013.01); *B60H 2001/00192* (2013.01)
(58) Field of Classification Search
CPC .... B60H 2001/00192; B60H 2001/002; B60H 2001/00721; B60H 2001/00092; B60H 1/00678; B60H 1/00064; B60H 1/00514
See application file for complete search history.

(56) References Cited

U.S. PATENT DOCUMENTS 6,178,764 B1 *   1/2001   Tanaka .................... F24F 13/24
                                                            62/239
8,251,406 B2 *   8/2012   Kawano .................... F15D 1/04
                                                            285/179

(Continued)

FOREIGN PATENT DOCUMENTS

JP         2003211936 A  *  7/2003   ......... B60H 1/00028
JP         2015199488 A  *  11/2015  ............... B60H 1/00

(Continued)

OTHER PUBLICATIONS

KR 20170040413 A English Machine Translation (Year: 2017).*
KR 20180029128 A English Machine Translation (Year: 2018).*

*Primary Examiner* — Jenna M Maroney
(74) *Attorney, Agent, or Firm* — MORGAN, LEWIS & BOCKIUS LLP

(57) ABSTRACT

A vehicle air conditioning system performing individual air conditioning in four zones for left and right spaces of front and rear seats includes a front seat heating, ventilation, and air conditioner (HVAC) separately supplying air having passed through left and right flow paths of a front seat flow path into the left and right spaces of the front seat to perform two-zone individual air conditioning for the front seat. A flow guide is provided in an upstream side space of an evaporator in an internal space of the air conditioning casing of the front seat HVAC to divide the upstream side space of the evaporator to have a left flow path and a right flow path. The flow guide and a side portion of the air conditioning casing opposite to the flow guide have a curved stepped portion in cross-section.

11 Claims, 10 Drawing Sheets

(56) References Cited

U.S. PATENT DOCUMENTS

| | | | | |
|---|---|---|---|---|
| 2002/0170707 A1* | 11/2002 | Shibata | ............. | B60H 1/00521 |
| | | | | 165/202 |
| 2004/0144521 A1* | 7/2004 | Farag | ................ | B60H 1/00028 |
| | | | | 165/41 |
| 2010/0043470 A1* | 2/2010 | Kang | ................ | B60H 1/00064 |
| | | | | 62/239 |
| 2012/0168117 A1* | 7/2012 | Jairazbhoy | ......... | B60H 1/00514 |
| | | | | 165/59 |
| 2016/0114648 A1* | 4/2016 | Ueno | ................ | B60H 1/00028 |
| | | | | 62/244 |
| 2017/0291468 A1* | 10/2017 | Jung | .................. | B60H 1/00678 |
| 2023/0331059 A1* | 10/2023 | Choi | .................. | B60H 1/00042 |

FOREIGN PATENT DOCUMENTS

| | | | | |
|---|---|---|---|---|
| KR | 20070039281 | A | * | 4/2007 |
| KR | 20080113992 | A | * | 12/2008 |
| KR | 10-1094846 | B | | 12/2011 |
| KR | 10-1461988 | B | | 11/2014 |
| KR | 20150021713 | A | * | 3/2015 |
| KR | 20150132630 | A | * | 11/2015 |
| KR | 2017-0040413 | A | | 4/2017 |
| KR | 2018-0029128 | A | | 3/2018 |
| KR | 10-2095394 | B | | 4/2020 |

* cited by examiner

HEATING, VENTILATION, AND AIR CONDITIONING SYSTEM FOR VEHICLE

CROSS-REFERENCE TO RELATED APPLICATION

The present application claims priority to Korean Patent Application No. 10-2021-0171084 filed on Dec. 2, 2021, the entire contents of which is incorporated herein for all purposes by this reference.

BACKGROUND OF THE PRESENT DISCLOSURE

Field of the Present Disclosure

The present disclosure relates to a heating, ventilation, and air conditioning system (HVAC) for a vehicle, and more particularly, to a heating, ventilation, and air conditioning system (HVAC) for a vehicle, which is configured so that a front seat HVAC is used and only a rear seat blower is additionally provided, rather than providing a complicated rear seat HVAC, so that independent 4-seat zone individual air conditioning including 2-front seat and 2-rear seat zone air conditioning is controllable, reducing the number of parts, improving package problems, reducing costs, and reducing weight.

Description of Related Art

In general, vehicles are provided with a heating, ventilation, and air conditioning system (HVAC) for regulating indoor temperature and generating a comfortable indoor environment. Recently, most of vehicles have been applied with a full automatic temperature control system (FATC) to automatically regulate the indoor temperature according to the temperature set by the driver or passenger for maintaining a comfortable indoor environment.

In the FATC, when a user sets a target temperature, to control a vehicle indoor temperature to have the target temperature set by a user, a controller determines indoor thermal load by use of information such as solar insolation, atmospheric temperature, indoor temperature, etc. detected by sensors, and then determines discharge mode, discharge temperature, discharge direction, discharge air volume, etc. based on corresponding air conditioning load.

Then, the controller controls door actuators of an air intake door (inside/outside air switching door), temp door (temperature control door), mode door (wind direction control door), etc., and operating elements such as an air conditioning blower, an air conditioning compressor, electric heater, etc. to control a supply of air-conditioning air according to the determined discharge mode, discharge temperature, discharge direction, and discharge air volume.

Furthermore, in the vehicle HVAC, the air conditioning mode is classified into several modes according to an air intake method and an air discharge method. According to the air intake method, the air conditioning mode may be divided into an outdoor air mode and an indoor air mode, and an air intake door and its door actuator are used to select and control the indoor air mode and the outdoor air mode.

According to the air discharge method, the air conditioning mode may be divided into a face mode (or vent mode), a floor (FLR) mode, a defrost (DEF) mode, a bi-level mode, etc. For this, a mode door that changes an air flow path according to respective mode, and its door actuator are used.

Furthermore, a heating, ventilation, and air conditioning (HVAC) vent may be divided into a face vent that discharges air toward user's face and chest, a floor vent that discharges air toward the vehicle floor and driver's feet, and a defrost vent that discharges air toward the windshield glass for respective modes.

On the other hand, as interest in energy efficiency and environmental pollution issues has recently increased, eco-friendly vehicles that can substantially replace internal combustion engine vehicles are being developed.

Eco-friendly vehicles include an electric vehicle (BEV) using a battery as a power source, a fuel cell vehicle (FCEV) using a fuel cell as a main power source, a hybrid electric vehicle (HEV) using both an engine and a motor as a vehicle driving source, and the like. All of these eco-friendly vehicles (xEVs) may be called electric vehicles in a broad sense in that they have something in common that they drive a motor with power charged in a battery in operation.

The electric vehicle is provided with a thermal management system for performing thermal management of the entire vehicle. The thermal management system of a vehicle may be defined in a broad sense as a system including an air conditioner for indoor heating and cooling, and a cooling system for thermal management and cooling of power electronic (PE) parts.

Here, the air conditioner includes an air conditioning system for circulating a coolant and a heat pump system. The air conditioning system mainly includes a compressor that compresses and delivers a coolant, a condenser that condenses the coolant compressed in the compressor, an expansion valve that expands the coolant condensed and liquefied in the condenser, and an evaporator that cools the air blown into a vehicle interior by use of the evaporative latent heat of the coolant while evaporating the coolant expanding through the expansion valve.

In such an air conditioning system, in the summer cooling mode, the high-temperature, high-pressure gaseous coolant compressed by the compressor is condensed through the condenser, and then circulated back into the compressor through the expansion valve and the evaporator. At the instant time, the expansion valve expands the condensed liquid coolant to a low temperature and low pressure, and the evaporator cools the air through heat exchange with the expanded coolant and then discharges the cooled air into the interior of a vehicle for cooling of vehicle interior.

The heat pump system may be used as an auxiliary heating device in addition to an electric heater (e.g., a PTC heater), which is a main heating device, and is a system configured to use a coolant of an air conditioning system for heating operation.

Furthermore, recently, according to vehicles, the internal space of a vehicle is divided into a plurality of zones, and an air conditioning system configured for performing an air conditioning operation for each zone is applied. As an example, there is known a three-zone type air conditioning system that performs an individual air conditioning operation on a front seat, i.e., a driver's seat and a front passenger's seat, and a second row-rear seat.

In such an air conditioning system, in the case of the driver's seat and the front passenger's seat, the air-conditioning air is discharged through vents provided on a dash panel, etc., and in the case of the rear seat, the air-conditioning air is discharged through a console vent provided on a console box, etc. Furthermore, in recent luxury vehicles, a center pillar vent and a rear floor outlet are additionally provided in addition to the console vent to further improve the cooling and heating performance of the rear seat space.

Furthermore, there is known a four-zone air conditioning system that includes a front seat HVAC and a rear seat HVAC (console HVAC) which may be independently controlled from each other to individually control the left and right spaces of the front and rear seats using the front and rear HVACs. In the known 4-zone air conditioning system, a temperature, an air conditioning mode, and a blower of the front seat are independently controlled using the feat seat HVAC (individual 2-zone air conditioning of the front seat), and a temperature, an air conditioning mode, and a blower of the rear seat are independently controlled using the rear seat HVAC (individual 2-zone air conditioning of the rear seat).

However, in the known 4-zone system, because the rear seat HVAC needs to be additionally provided together with the front seat HVAC, the number of portions excessively increases and the overall configuration of the air conditioning system is complicated. There is a disadvantage in that the front seat HVAC and the rear seat HVAC need to be provided separately, so a separate installation space is required in terms of packaging, and there are problems in terms of cost and excessive weight.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a vehicle air conditioning system in which a front seat heating, ventilation, and air conditioning system (HVAC) and an additional rear seat blower are provided without a complicated rear seat HVAC to independently perform an individual 4-zone air conditioning operation on 2-zone of a front seat and 2-zone of a rear seat, reducing the number of parts, improving packaging problems, and reducing costs and weight.

The objectives of the present disclosure are not limited to those as described above, and other unmentioned objectives of the present disclosure may be clearly understood from the following description by those of ordinary skill in the art to which the present disclosure pertains (hereinafter, "ordinary technicians").

In one aspect of the present disclosure, there is provided a vehicle air conditioning system configured for performing individual air conditioning in four zones for left and right spaces of a front seat and left and right spaces of a rear seat in a vehicle interior, the air conditioning system including: a front seat heating, ventilation, and air conditioner (HVAC) separately supplying air that has passed through left and right flow paths of a front seat flow path in an air conditioning casing into the left and right spaces of the front seat to perform two-zone individual air conditioning for the front seat, wherein a flow guide is provided in an upstream side space of an evaporator in an internal space of the air conditioning casing of the front seat HVAC to divide the upstream side space of the evaporator to have a left flow path and a right flow path, wherein the flow guide and a side portion of the air conditioning casing opposite to the flow guide have a curved stepped portion in cross-section.

The flow guide may be disposed along the space between the side portion of the air conditioning casing and a front portion of the evaporator, and an interval between the stepped portion of the side portion of the air conditioning casing and the stepped portion of the flow guide may be the same as an interval between the stepped portion of the flow guide and the front portion of the evaporator.

The stepped portion of the side portion of the air conditioning casing and the stepped portion of the flow guide may have the same stepped curved shape.

The flow guide may be disposed along the space between the side portion of the air conditioning casing and the front portion of the evaporator, and cross-sectional areas of the left and right flow paths divided by the flow guide in the space between the side portion of the air conditioning casing and the front portion of the evaporator may have the same size.

An air volume control door may be provided in a space from an air inlet, through which air blown by an air conditioning blower is introduced, to the flow guide in the air conditioning casing to control a volume of the air distributed into the left flow path and the right flow path.

A shaft portion may be formed along an end portion of the air volume control door, the flow guide may be provided with a shaft coupling portion to which the shaft portion of the air volume control door is rotatably coupled, and the air volume control door may be rotated around the shaft portion and the shaft coupling portion by a door actuator.

A separator may be provided in the internal space of the air conditioning casing to divide a downstream side space of the evaporator into a left flow path and a right flow path so that the air distributed by the flow guide passes through the evaporator and then flows separately through the left flow path and the right flow path.

The vehicle air conditioning system may further include: a rear seat extension duct provided to separately supply air having passed through the left and right flow paths of the rear seat flow path in the air conditioning casing of the front seat HVAC to the rear seat; a rear seat blower unit provided in a middle portion of the rear seat extension duct to draw air that has passed through the left and right flow paths of the rear seat flow path in the air conditioning casing through the rear seat extension duct, and then blow the drawn in air; and a vent duct provided to extend left and right from the rear seat extension duct to separately supply air blown by the rear seat blower unit into the left and right spaces of the rear seat.

The rear seat extension duct and a blower casing of the rear seat blower unit may have a left flow path and a right flow path, through which air having passed through the left flow path and the right flow path of the rear seat flow path flows separately.

A rear seat blower of the rear seat blower unit may include: a blower motor; and a total of two blower fans disposed one by one in a left passage and a right passage of the blower casing to rotate with the rotation force from the blower motor.

An air volume control door may be provided in the left passage and the right passage of the blower casing at a position downstream of respective blower fans to control the air volume in the corresponding passage.

As set forth above, according to the vehicle HVAC of the present disclosure, the front HVAC and the additional rear seat blower are provided without a complicated rear seat HVAC to independently perform an individual 4-zone air conditioning operation on 2-zone of a front seat and 2-zone of a rear seat, reducing the number of parts, improving packaging problems, and reducing costs and weight.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
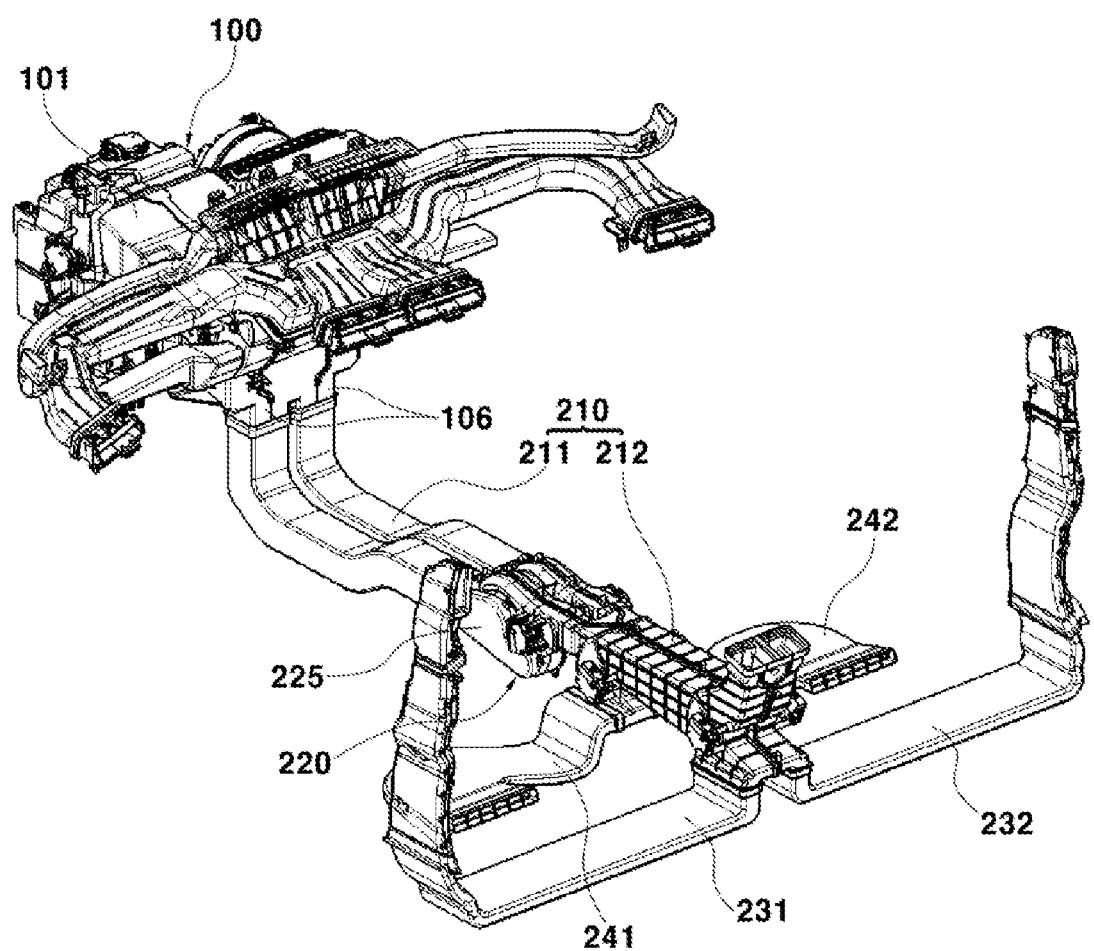
FIG. 1 is a perspective view exemplarily illustrating an air conditioning system for a vehicle according to an exemplary embodiment of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Specific structures or functions presented in embodiments of the present disclosure are only exemplified for the purpose of describing embodiments according to the concept of the present disclosure, which may be implemented in various forms. Furthermore, the present disclosure should not be construed as being limited to the exemplary embodiments described herein, and should be understood to include all modifications, equivalents, and substitutes included in the spirit and scope of the present disclosure.

It will be understood that, although the terms "first," "second," etc. may be used herein to describe various elements, these elements should not be limited by these terms. These terms are only used to distinguish one element from another element. For instance, a first element discussed below could be termed a second element without departing from the teachings of the present disclosure. Similarly, the second element could also be termed the first element.

It will be understood that when an element is referred to as being "coupled" or "connected" to another element, it may be directly coupled or connected to the other element or intervening elements may be present therebetween. In contrast, it should be understood that when an element is referred to as being "directly coupled" or "directly connected" to another element, there are no intervening elements present. Other expressions that explain the relationship between elements, such as "between," "directly between," "adjacent to," or "directly adjacent to," should be construed in a same way.

Reference numbers refer to the same or equivalent parts of the present disclosure throughout the specification. The terminology used herein is for the purpose of describing embodiments only and is not intended to be limiting. As used herein, the singular forms "a," "an" and "the" are intended to include the plural forms as well, unless the context clearly indicates otherwise. It will be further understood that the terms "comprise" and/or "comprising", when used in the present specification, specify the presence of stated component, step, operation, and/or element, but do not preclude the presence or addition of one or more other components, steps, operations, and/or elements.

The present disclosure is directed to a vehicle air conditioning system in which a front seat heating, ventilation, and air conditioning system (HVAC) and an additional rear seat blower are provided without a complicated rear seat HVAC to independently perform an individual 4-zone air conditioning operation on 2-zone of a front seat and 2-zone of a rear seat, reducing the number of parts, improving packaging problems, and reducing costs and weight.

In the air conditioning system according to an exemplary embodiment of the present disclosure, in addition to the front seat HVAC, only a rear seat blower for rear seat air conditioning is additionally provided and used, and in the instant case, existing rear seat HVAC components such as a console heater and an evaporator are deleted.

Accordingly, in the air conditioning system according to an exemplary embodiment of the present disclosure, 4-zone air conditioning control is implemented in the front and rear seats using only the front seat HVAC so that the air for heating and cooling supplied from the front seat HVAC is blown by the rear seat blower (console blower) toward the rear seat through a duct to control the rear seat-discharged air volume.

Hereinafter, an exemplary embodiment of the present disclosure will be described in more detail with reference to the accompanying drawings.

FIG. 1 is a perspective view exemplarily illustrating an air conditioning system for a vehicle according to an exemplary embodiment of the present disclosure, showing components configured for supplying air-conditioning air to front and rear seats using a front seat heating, ventilation, and air conditioning system (front seat HVAC) 100. Here, the air-conditioning air is air which is discharged into the vehicle interior through a duct and a vent after the temperature is controlled by the front seat HVAC 100.

Referring to FIG. 1, a console vent duct 210, a rear seat blower unit 220, and center pillar vent ducts 231 and 232 and rear floor ducts 241 and 242 for distributing a portion of the air-conditioning air whose temperature is controlled by the front seat HVAC 100 and supplying the distributed air to the rear seat are shown.

As illustrated, the console vent duct 210 is provided to extend long backward from a rear seat air outlet 106 located in the center portion of the lower end portion of the front seat HVAC 100 to the position of the console box.

In the console vent duct 210, an air inlet, which is the front end portion of the console vent duct, may be connected to the rear seat air outlet 106 of the front seat HVAC 100, and a console vent may be connected to an air outlet 232, which is the rear end portion (terminal) of the console vent duct 210. The console vent is a vent provided on a console box to separately discharge air into a left space and a right space of the rear seat, and a grill is provided on an outlet of the console vent.

Although the console vent and the grill are not illustrated in FIG. 1, the structure in which the console vent is provided on the console box is a known technical matter, and without illustrative examples, those of ordinary skill in the art will be able to fully understand that the console vent is provided to be connected to the air outlet 232 of the console vent duct 210.

The console vent duct 210 is a rear seat extension duct for supplying air-conditioning air blown by an air conditioning blower of the front seat HVAC 100 to the rear seat, and in the middle portion of the present console vent duct 210, a rear seat blower unit 220 is provided. Although not shown in detail in the drawings, the rear seat blower unit 220 includes a blower casing 225 and a rear seat blower housed in the blower casing 225.

In an exemplary embodiment of the present disclosure, the console vent duct 210 may include a front console vent duct 211 and a rear console vent duct 212, wherein the rear seat blower unit 220 may be connected between the front console vent duct 211 and the rear console vent duct 212.

In the rear seat blower unit 220, a rear outlet of the front console vent duct 211 is connected to an inlet of a blower casing 225, and a front inlet of the front console vent duct 211, that is, the air inlet, is connected to the rear seat air outlet 106 of the front seat HVAC 100.

Furthermore, in the rear seat blower unit 220, a front inlet of the rear console vent duct 212 is connected to an outlet of the blower casing 225, and a console vent is connected to a rear outlet of the rear console vent duct 212, that is, the air outlet.

The rear seat blower unit 220 is provided to draw the air-conditioning air whose temperature has been adjusted in the front seat HVAC 100 and supply the drawn in air to the rear seat so that in operation, the blower unit draws the air from the front seat HVAC 100 through the front console vent duct 211 and blows the drawn in air to the rear seat through the rear console vent duct 212.

Accordingly, when the air-conditioning air is blown by an air conditioning blower of the front seat HVAC 100, a portion of the blown air is discharged to the front console vent duct 211 through the rear seat air outlet 106 of the front seat HVAC 100, and then the discharged air is drawn in and blown by the rear seat blower unit 220 to the position of the console box along the rear console vent duct 212, and finally is discharged to the rear seat space through the console vent.

Furthermore, vent ducts 231 and 232 including a structure branching to the left and right from the rear console vent duct 212, which is the rear end portion (downstream) console vent duct of the rear seat blower unit 220, are provided. The vent ducts 231 and 232 are vent ducts that are connected to the console vent duct 210, which is a rear seat extension duct, for separately supplying air-conditioning air supplied through the console vent duct 210 to the left space and right space of the rear seat.

The vent ducts 231 and 232 may be center pillar vent ducts that, respectively extend left and right from the console vent duct 210, which is a rear seat extension duct, to the left and right center pillars (B pillars) of a vehicle. The center pillar vent ducts 231 and 232 respectively extend left and right from the console vent duct 210 to the left and right center pillar, wherein center pillar vents are provided on terminal end portions, i.e., air outlets, of the respective center pillar vent ducts 231 and 232. The center pillar vents are fixed on respective left and right center pillars at a predetermined height.

The respective center pillar vent ducts 231 and 232 guides air-conditioning air blown by the rear seat blower unit 220 from the console vent duct 210 toward the center pillar. Accordingly, the air-conditioning air drawn in and blown by the rear seat blower unit 30 is distributed from the console vent duct 210 to the left center pillar vent duct 231 and the right center pillar vent duct 232, and then to the left space and right space of the rear seat through the respective center pillar vents provided on the left and right center pillars.

Although the center pillar vent and the grill are not illustrated in FIG. 1, the structure in which the center pillar vents are respectively provided on the left and right center pillars is a known technical matter, and without illustrative examples, those of ordinary skill in the art will be able to fully understand that the console vents are provided on the respective air outlets of the left and right center pillars vent ducts 231 and 232.

Furthermore, rear floor ducts 241 and 242 including a structure branching left and right are connected to the console vent duct 210 so that the two rear floor ducts 241 and 242 are disposed to extend left and right from the console vent duct 210. Referring to FIG. 1, it may be seen that a left rear floor duct 241 and a right rear floor duct 242 are connected to the side of the rear console vent duct 212 which is the console vent duct on the rear end side (downstream) of the rear seat blower unit 220.

The left rear floor duct 241 and the right rear floor duct 242 may be provided on the floor under the front seat, and respectively have air outlets provided to face backward from the lower side of the front seat. Accordingly, the air blown out by the rear seat blower unit 220 is distributed from the console vent duct 210 to the left rear floor duct 241 and the right rear floor duct 242, and then to the rear seat space through the respective air outlets.

Hereinafter, a front seat heating, ventilation, and air conditioner (HVAC) according to an exemplary embodiment of the present disclosure will be described in detail with reference to the drawings.

Figure 2:
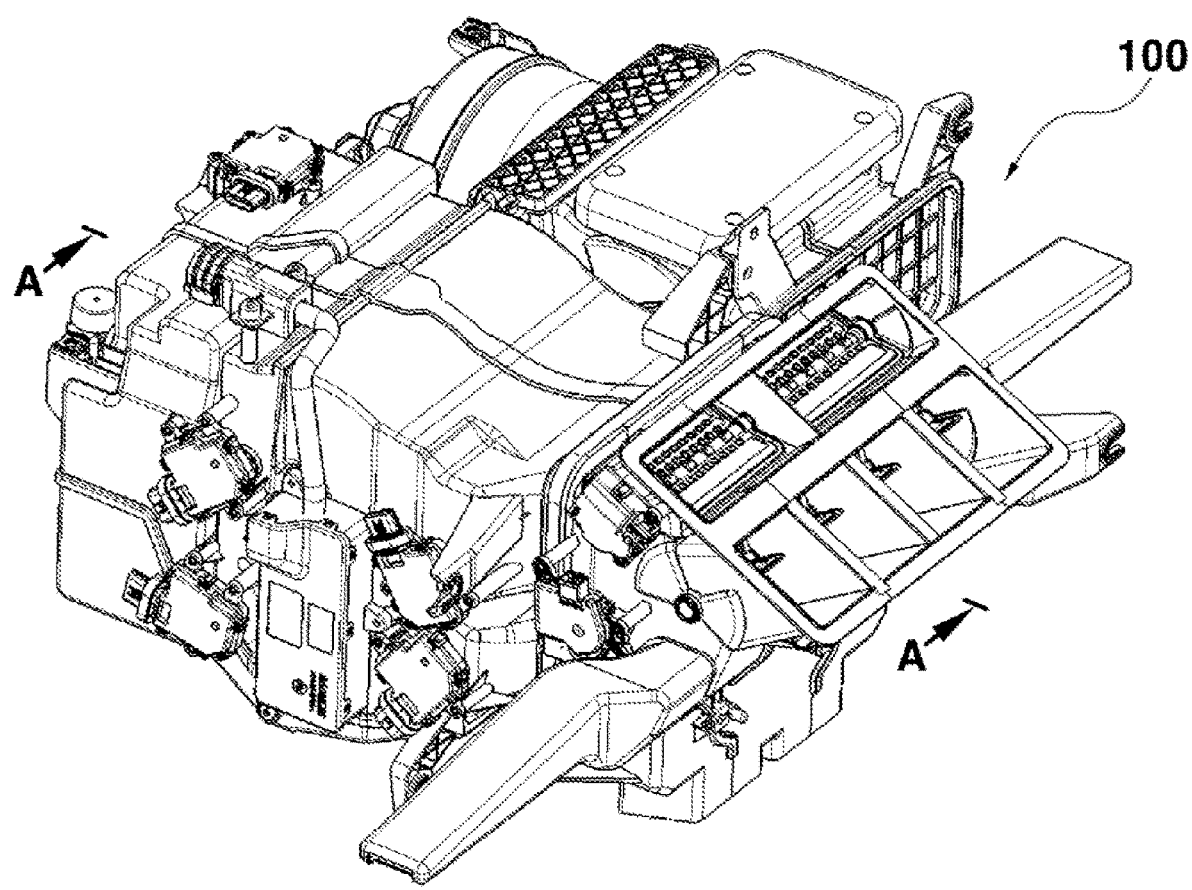
FIG. 2 is a perspective view exemplarily illustrating a front seat heating, ventilation, and air conditioner (HVAC) among the configuration of the air conditioning system according to an exemplary embodiment of the present disclosure.
Figure 3:
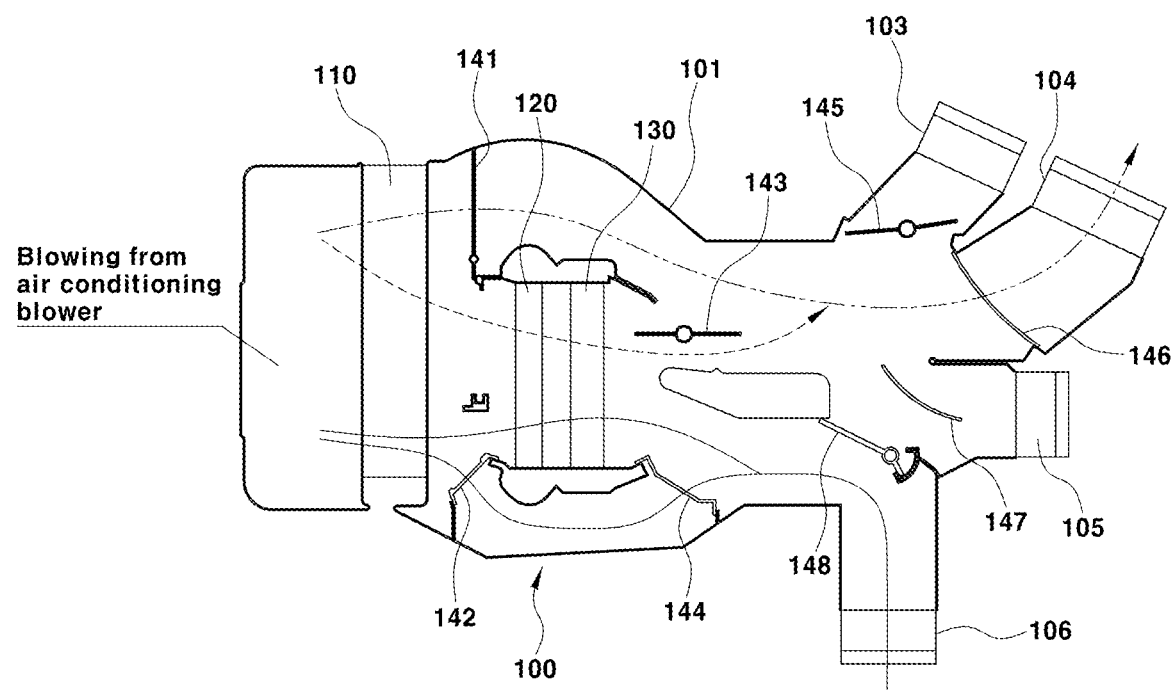
FIG. 3 is a cross-sectional view taken along line 'A-A' of FIG. 2.

FIG. 2 is a perspective view exemplarily illustrating a front seat HVAC among the configuration of the air conditioning system according to an exemplary embodiment of the present disclosure, and FIG. 3 is a cross-sectional view taken along line 'A-A' of FIG. 2. FIG. 3 is a cross-sectional view of the front seat HVAC in which major components thereof, including an evaporator 110, an auxiliary heating heater (internal condenser) 120, a main heating heater (PTC heater) 130, and a temp door (temperature control door) 141 to 144 are disposed in an air conditioning casing 101.

The evaporator 110 is disposed on the upstream side based on an air flow direction in the air conditioning casing 101, and the auxiliary heating heater 120 and the main heating heater 130 are sequentially disposed on the downstream side of the evaporator. Here, the evaporator 110 is provided to allow a coolant of an air conditioning system to pass through so that after being compressed by a compressor, the coolant passes through the evaporator 110 via a condenser and an expansion valve.

In the evaporator 110, heat exchange is conducted between the coolant passing through the interior of the evaporator and air blown and flowing around the evaporator by an air conditioning blower. Accordingly, the air cooled by the heat exchange is supplied into the vehicle interior to perform indoor cooling.

The auxiliary heating heater 120 is provided to allow a coolant of an air conditioning system to pass through the internal thereof and to allow the air blown by the air conditioning blower to pass around the auxiliary heating heater. In the auxiliary heating heater 120, heat exchange is conducted between the coolant passing through the interior of the auxiliary heating heater and air flowing around the auxiliary heating heater, so that the air is heated by relatively high temperature coolant during the heat exchange and is supplied into the vehicle interior to perform the indoor heating.

The auxiliary heating heater 120 may be another condenser, i.e., an internal condenser which is provided separately from the condenser (external condenser) of an air conditioning system, and the coolant may be compressed to high temperature and high pressure by the compressor of the air conditioning system and may be supplied to the auxiliary heating heater 120 through a coolant line. The coolant that has passed through the auxiliary heating heater 120 is then discharged back to and circulated through the coolant line of the air conditioning system.

The main heating heater 130 may be an electric heater that generates heat with the consumption of power from a battery, and may be, for example, a PTC heater.

Referring to FIG. 2, it may be seen that a plurality of temp doors 141, 142, 143 and 144 are provided inside of the air conditioning casing 101. The plurality of temp doors includes a first temp door 141, a second temp door 142, a third temp door 143, and a fourth temp door 144 for controlling the air amount passing through the evaporator 110 alone, and the air amount passing through all of the evaporator 110, the auxiliary heating heater 120, and the main heating heater 130.

Here, the first temp door 141 and the third temp door 143 are for controlling the air amount supplied to the front seat, and the second temp door 142 and the fourth temp door 144 are for controlling the air amount supplied to the rear seat.

Furthermore, the air conditioning casing 101 is provided with a defrost vent 103, a face vent 104, and a floor vent 105 as a front seat flow path for supplying air to the front seat, wherein respective vents 103, 104 and 105 are provided with mode doors 145, 146 and 147 for opening and closing internal passages thereof.

Furthermore, the air conditioning casing 101 is provided with a rear seat air outlet 106 as a rear seat flow path for supplying air to the rear seat, and the rear seat air outlet 106 is connected to an air inlet which is the front end portion of the console vent duct (210' in FIG. 1) as described above. Furthermore, a rear seat door 148 for opening and closing an internal passage is provided on the rear seat flow path connected to the rear seat air outlet 106. Furthermore, the front seat HVAC 100 includes door actuators for rotating respective doors 141, 142, 143, 144, 145, 146, 147 and 148.

Meanwhile, in the front seat HVAC 100, a separator is provided inside of the air conditioning casing 101 to divide the front seat flow path and the rear seat flow path into a left flow path and a right flow path. The separator divides the downstream side space of the evaporator 110 into left and right flow paths so that the air distributed in the internal space of the air conditioning casing 101 by a flow guide 163 to be described later passes through the evaporator 110 and then separately flows through the left and right flow paths.

At the present time, one first temp door 141 and one third temp door 143 are respectively provided on the left flow path and the right flow path divided by the separator among the front seat flow paths. Similarly, one second temp door 142 and one fourth temp door 144 are respectively provided on the left flow path and the right flow path divided by the separator among the rear seat flow paths. In the instant case, door actuators may also be respectively provided to doors one by one.

Accordingly, a volume of the air passing through the left flow path and the right flow path divided by the separator among the front seat flow paths in the air conditioning casing 101 may be controlled by the first temp door 141 and the third temp door 143, so that independent air conditioning control for the left and right spaces of the front seat, that is, individual air conditioning control for 2-zone of the front seat, may be conducted in the vehicle interior.

Similarly, a volume of the air passing through the left flow path and the right flow path divided by the separator among the rear seat flow paths in the air conditioning casing 101 may be controlled by the second temp door 142 and the fourth temp door 144, so that independent air conditioning control for the left and right spaces of the rear seat, that is, individual air conditioning control for 2-zone of the rear seat, may be conducted in the vehicle interior.

As a result, it is possible to control the temperature of the air-conditioning air supplied to the front and rear seats in a total of four types, and by dividing and supplying the temperature-controlled air to the left space and the right space for the front and rear seats, individual air conditioning control may be performed for a total of 4-zone of front and rear seats, including 2-zone of the front seat and 2-zone of the rear seat.

Figure 4:
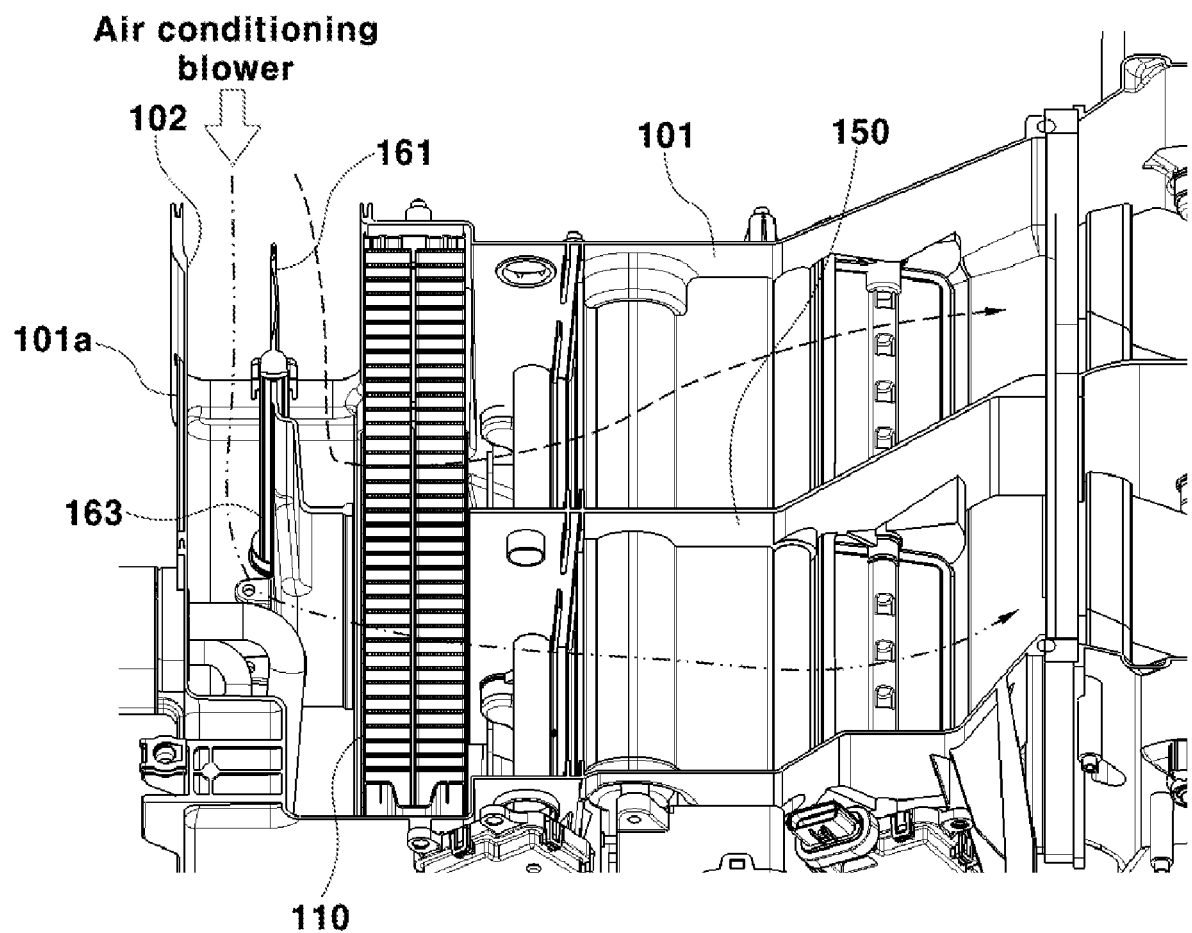
FIG. 4, FIG. 5 and FIG. 6 are views exemplarily illustrating a state in which a separator is provided inside of an air conditioning casing according to an exemplary embodiment of the present disclosure.
Figure 5:
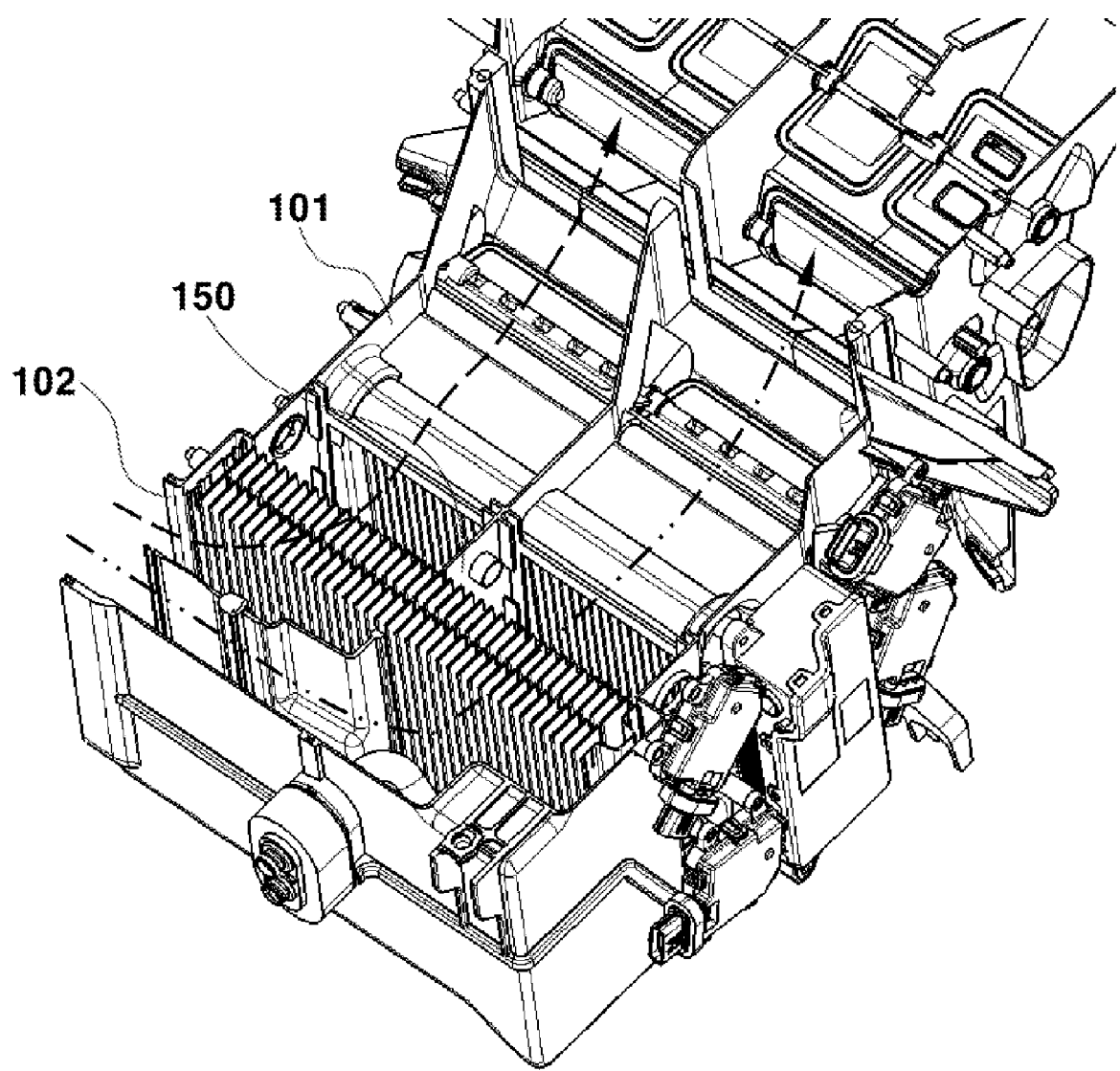
Figure 6:
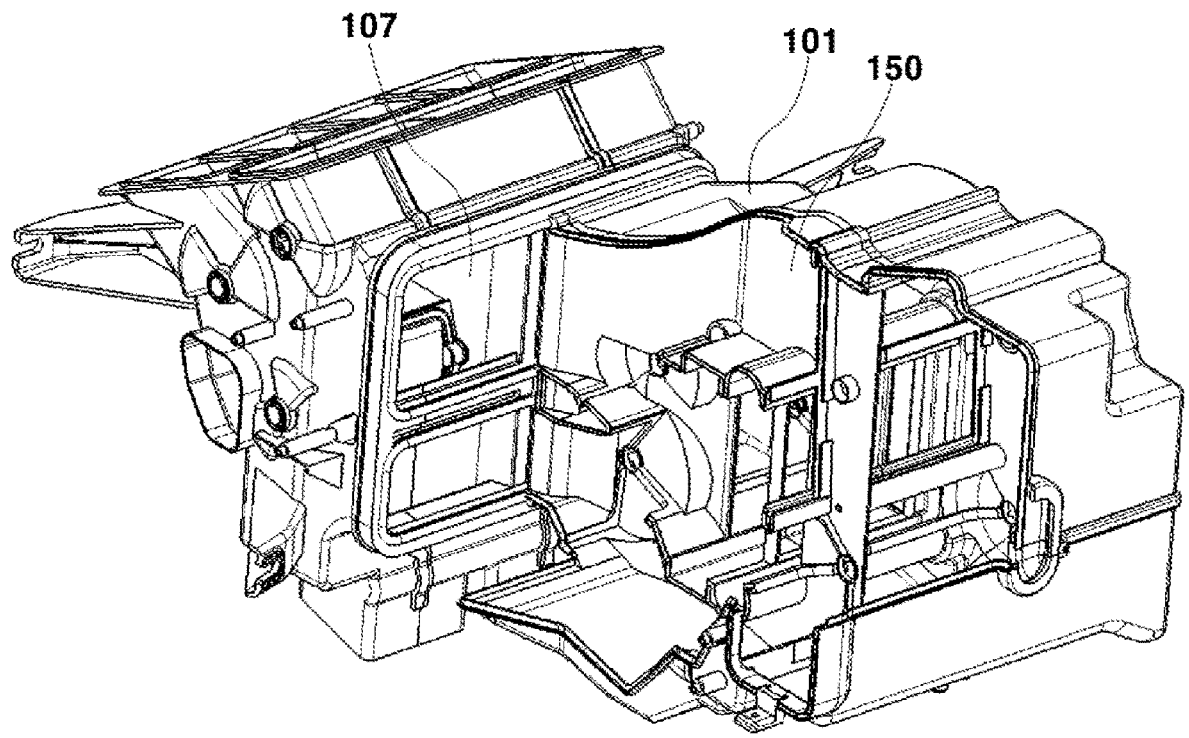

FIG. 4, FIG. 5 and FIG. 6 are perspective views exemplarily illustrating a state in which a separator is provided inside of an air conditioning casing according to an exemplary embodiment of the present disclosure, wherein the air conditioning casing 101 and the like is partially cutout to show the provided state inside of the air conditioning casing. In the drawings, both the air conditioning blower and the blower casing are not illustrated.

As illustrated, the separator 150 is provided to divide the internal space of the air conditioning casing 101 into a left space and a right space. By the separator 150 provided in the present way, the internal space of the air conditioning casing 101 may be divided into a left flow path and a right flow path through which air can pass.

In more detail, an air inlet 102 of the air conditioning casing 101 is coupled with an outlet of a blower casing including a built-in air conditioning blower, and a plurality of vents 103, 104 and 105 and a rear seat air outlet 106 are provided on the downstream side of the air conditioning casing 101 (refer to FIG. 3).

At the present time, as a plurality of vents, a defrost vent 103, a face vent 104, and a floor vent 105 may be formed on the downstream side of the air conditioning casing 101 (see FIG. 3), and the internal passages of the plurality of vents 103, 104 and 105 and rear seat air outlet 106, which are formed on the downstream side of the air conditioning casing 101, are all divided into left spaces (left flow paths) and right spaces (right flow paths) by an internal partition wall ('107' in FIG. 6).

Accordingly, respective vents 103, 104 and 105 and the rear seat air outlet 106 may be divided by the partition wall into left flow paths and right flow paths, on which mode doors 145, 146 and 147 and a rear door 148, which are operated by respective door actuators, are provided.

Also, the evaporator 110 is disposed downstream of the air inlet 102 in the inside of the air conditioning casing 101. The separator 150 is provided on the downstream side of the evaporator 110 to divide an internal space of the air conditioning casing 101 into a left space and a right space. The separator 150 is provided to the position on the upstream side of the respective vents 143 to 145 and the rear seat air outlet 146 via an auxiliary heating heater ('120 in FIG. 3) and the main heating heater ('130' in FIG. 3).

In other words, the separator 150 is a planar member which is provided to divide the internal space of the air conditioning casing 101 into a left space (left flow path) and a right space (right flow path) from the position on the downstream side of the evaporator 110 to the position on the upstream side of the portion where the respective vents 143 to 145 and the rear seat air outlet 146 are formed.

On the other hand, although not illustrated in the drawings, the partition wall is a wall portion which is formed to divide respective internal passages of the defrost vent 103, the face vent 104, and the floor vent 105 in the air conditioning casing 101 and the internal passage of the rear seat air outlet 106 into left spaces (left flow paths) and right spaces (right flow paths).

As described above, the separator 150 and the partition wall have a common feature in that they act as dividing the front seat flow path and the rear seat flow path into left flow paths and right flow paths, respectively, in the internal space of the air conditioning casing 101.

Figure 7:
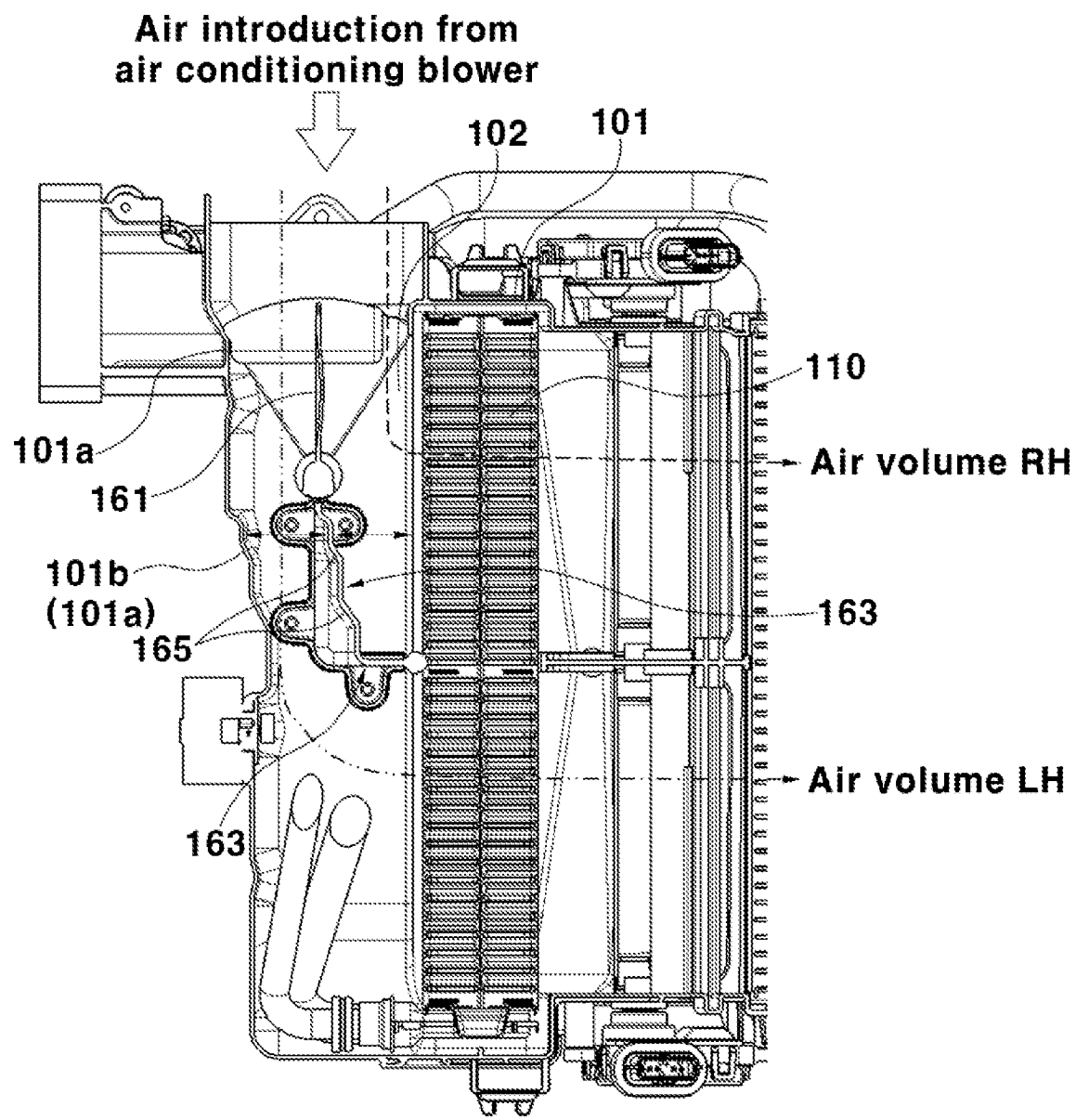
FIG. 7 is a cross-sectional view exemplarily illustrating a state in which an air volume control door and a flow guide are provided in the space on the upstream side of an evaporator in the air conditioning casing according to an exemplary embodiment of the present disclosure.

Next, FIG. 7 is a cross-sectional view exemplarily illustrating a state in which an air volume control door and a flow guide are provided in the space on the upstream side of an evaporator in the air conditioning casing according to an exemplary embodiment of the present disclosure, showing that the air volume control door 161, the flow guide 163, and the evaporator 110 are disposed in a plan view.

Figure 8:
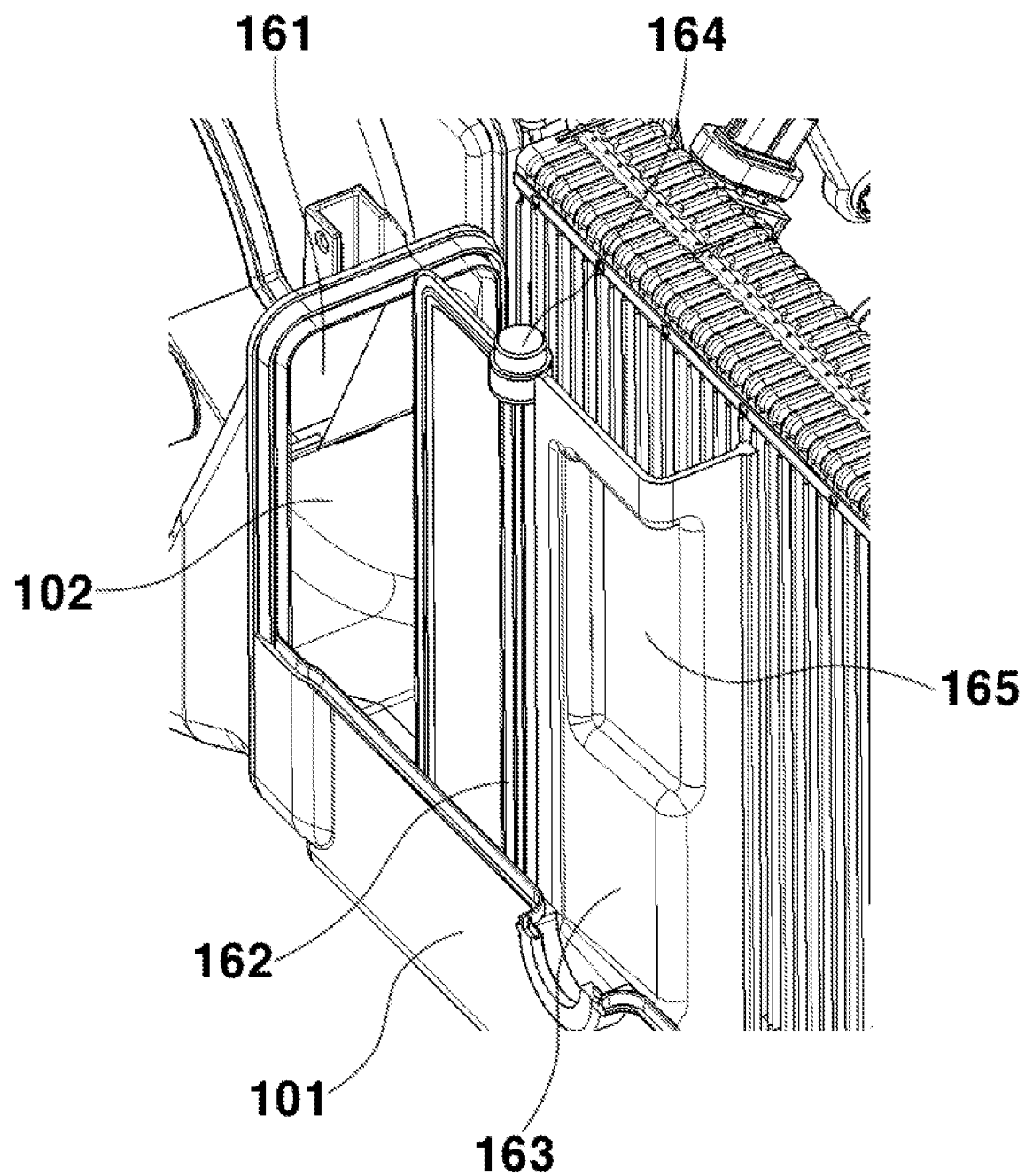
FIG. 8 is a perspective view exemplarily illustrating a state in which the air volume control door and the flow guide are provided with the air conditioning casing partially cutout according to an exemplary embodiment of the present disclosure.
Figure 9:
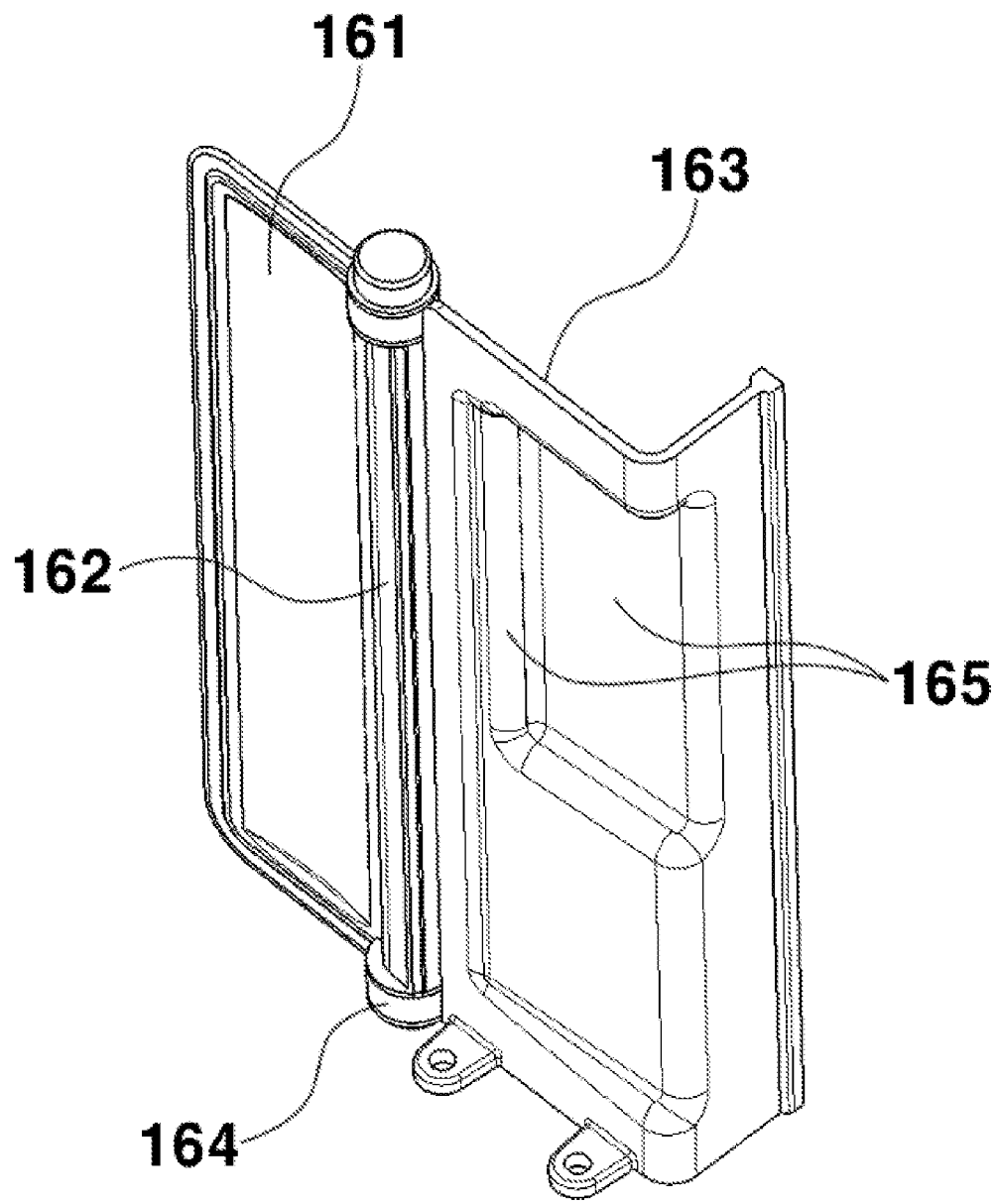
FIG. 9 is a perspective view exemplarily illustrating an air volume control door and a flow guide according to an exemplary embodiment of the present disclosure.

FIG. 8 is a perspective view exemplarily illustrating a state in which the air volume control door and the flow guide are provided with the air conditioning casing partially cutout according to an exemplary embodiment of the present disclosure, and FIG. 9 is a perspective view exemplarily illustrating an air volume control door and a flow guide according to an exemplary embodiment of the present disclosure.

As illustrated, the air inlet 102 is formed at an upstream position of the evaporator 110 in the internal space of the air conditioning casing 101, and the air inlet 102 is connected to a blower casing 225 of an air conditioning blower unit, that is, an outlet of the blower casing 225 housing an air conditioning blower in the air conditioning blower unit.

Furthermore, in the space on the upstream side of the evaporator 110 in the internal space of the air conditioning casing 101, the air volume control door 161 and the flow guide 163 are provided to divide the space from the air inlet 102 to the evaporator 110 into a left space and a right space.

The air volume control door 161 is rotatably provided in the internal space of the air conditioning casing 101. To the present end, a shaft portion 162 is integrally formed with one end portion of the air volume control door 161 so that the shaft portion 162 is rotatably coupled to a shaft coupling portion 164 provided in the internal space of the air conditioning casing 101.

Furthermore, the shaft portion 162 is provided to be rotated in the shaft coupling portion 164 by receiving the rotation force of a door actuator. In the instant case, both end portions of the shaft portion 162 may be rotatably coupled to the shaft coupling portion 164 of the air conditioning casing 101. As a result, when the shaft portion 162 is rotated by a door actuator, the air volume control door 161 may be integrally rotated with the shaft portion 162.

Accordingly, because the air volume control door 161 is integrally rotated with the shaft portion 162, which rotates in the shaft coupling portion 164, the rotation center portion of the air volume control door 161 is the shaft portion 162 and the shaft coupling portion 164 to which the present shaft portion is coupled.

The air volume control door 161 divides the space from the air inlet 102 to the shaft portion 162 in the internal space of the air conditioning casing 101 into a left space and a right space. Accordingly, the opening amount of the divided left and right spaces may be regulated according to the rotation direction and angle of the air volume control door 161 rotated by a door actuator. Furthermore, the air amount passing through the left space and the right space may be regulated.

A planar flow guide 163 is fixed on the downstream side of the air volume control door 161 in the internal space of the air conditioning casing 101 to divide the space from the shaft portion 162 of the air volume control door 161 to the evaporator 110 into a left space and a right space.

As a result, the space on the upstream side of the evaporator 110 in the internal space of the air conditioning casing 101, that is, the space from the air inlet 102 to the evaporator 110, includes the left space and the right space by the air volume control door 161 and the flow guide 163. The left space and the right space, which are divided by the air volume control door 161 and the flow guide 163, become a left flow path and a right flow path, through which after being blown by the air conditioning blower and then introduced into the internal space of the air conditioning casing 101 through the air inlet 102, the air is distributed and flows.

As a result, when the air blown by the air conditioning blower flows into the internal space of the air conditioning casing 101 through the air inlet 102, the air flow is distributed and flows to the left and right flow paths divided by the air volume control door 161 and the flow guide 163 in the path from the air inlet 102 to the evaporator 110.

At the present time, the air flows along the left flow path and the right flow path in a state in which the distribution amount is controlled by the air volume control door 161, and then passes through the evaporator 110. After passing through the evaporator 110, the air flows along the left and right flow paths divided by the separator 150.

Accordingly, the air having passed through the left and right flow paths is discharged from the air conditioning casing 101 through the vents 143 to 145 and the rear seat air outlet 106 into the left and right spaces of the front seat and the left and right spaces of the rear seat.

At the present time, the air having passed through the left flow path is finally discharged into the left spaces of the front and rear seats, and the air having passed through the right flow path is finally discharged into the right spaces of the front and rear seats. A volume of air discharged into the left and right flow paths in the internal space of the air conditioning casing 101 is regulated by the air volume control door 161.

Furthermore, because the opening amount of the left flow path and the right flow path is controlled by the air volume control door 161, and the air volume of the left flow path and the right flow path is regulated according to the rotational position (rotation direction and angle) of the air volume control door 161, the air amount discharged into the left and right spaces of the front and rear seats may be regulated by controlling the rotational position of the air volume control door 161.

Referring to FIG. 8 and FIG. 9, it may be seen that the shaft coupling portion 164 is formed in the flow guide 163, and the shaft portion 162 including a vertically extending shape is formed on the rear end portion of the air volume control door 161. As illustrated in FIG. 8 and FIG. 9, the shaft portion 162 of the air volume control door 161 is rotatably coupled to the shaft coupling portion 164 of the flow guide 163, wherein both end portions of the shaft portion 162 may be coupled to the shaft coupling portions 164 respectively formed at upper and lower end portions of the flow guide 163.

Furthermore, as illustrated in FIG. 7, a portion of a side portion 101*a* of the air conditioning casing 101 may have a stepped curved shape in cross-section. Here, the side portion 101*a* is a portion on the upstream side of the evaporator 110 in the air conditioning casing 101 and opposite to a front portion of the evaporator 110.

The flow guide 163 is disposed between the side portion 101*a* of the air conditioning casing 101 and the front portion of the evaporator 110, and at least a portion of the flow guide 163 disposed in the space between the side portion 101*a* of the air conditioning casing 101 and the front portion of the evaporator 110 may have a same stepped curved shape in cross-section as the side portion 101*a* of the air conditioning casing 101.

In the instant case, the curved stepped portion 165 of the flow guide 163 may be opposite to the curved stepped portion ('101*b*' in FIG. 7) of the side portion 101*a* of the air conditioning casing 101. That is, at least a portion of the side portion 101*a* of the air conditioning casing 101 and at least a portion of the flow guide 163 may have a stepped curved shape in cross-section, and in the instant case, a curved stepped portion 101*b* in cross-section of the side portion 101*a* of the air conditioning casing 101 and a stepped curved portion 165 in cross-section of the flow guide 163 face each other.

Furthermore, the interval between the curved stepped portion 101*b* of the side portion 101*a* of the air conditioning casing 101 and the curved stepped portion 165 of the flow guide 163 opposed thereto is configured to be approximately equal to the interval between the curved stepped portion 165 of the flow guide 163 at the same position and the front portion of the evaporator 110. To the present end, it is configured so that with respect to the curved stepped portions 101*b* and 165, the cross-sectional shape of the flow guide 163 is approximately the same as the cross-sectional shape of the side portion 101*a* of the air conditioning casing 101, and the side portion 101*a* of the air conditioning casing 101 and the flow guide 163 are disposed side by side thereof.

Furthermore, with respect to the curved stepped portions 101*b* and 165, as an interval (spaced distance) in a direction perpendicular to an internal surface of the side portion 101*a* of the air conditioning casing 101, the interval between the side portion 101*a* of the air conditioning casing 101 and the flow guide 163 is configured to be approximately equal to the interval between the flow guide 163 and the front portion of the evaporator 110.

That is, when the flow guide 163 divides the space between the side portion 101*a* of the air conditioning casing 101 and the front portion of the evaporator 110 into a left space and a right space, the flow guide 163 is disposed along an intermediate position between the side portion 101*a* of the air conditioning casing 101 and the front portion of the evaporator 110.

Accordingly, the cross-sectional areas of the left and right flow path spaces divided by the flow guide 163 may have the same level. The cross-sectional area of the flow path between the side portion 101*a* of the air conditioning casing 101 and the flow guide 163 and the cross-sectional area of the flow path between the flow guide 163 and the front portion of the evaporator 110 may have the same level.

Accordingly, when the air blown by the air conditioning blower and then introduced into the internal space of the air conditioning casing 101 through the air inlet 102 is uniformly distributed 1:1 into the left and right flow paths by the air volume control door 161, the same air amount may be equally distributed into and flow through the left flow path and the right flow path both having the same flow path cross-sectional area and divided by the flow guide 163 without a great difference in flow rate.

Figure 10:
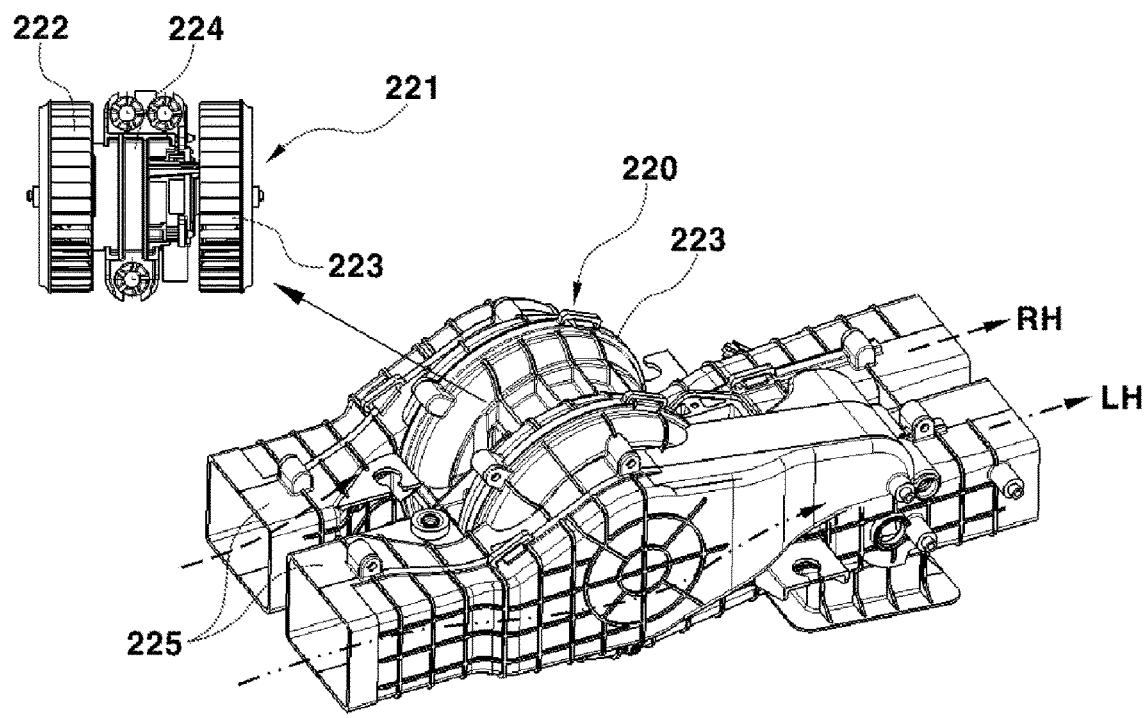
FIG. 10 is a perspective view exemplarily illustrating a rear seat blower unit according to an exemplary embodiment of the present disclosure.
Figure 11:
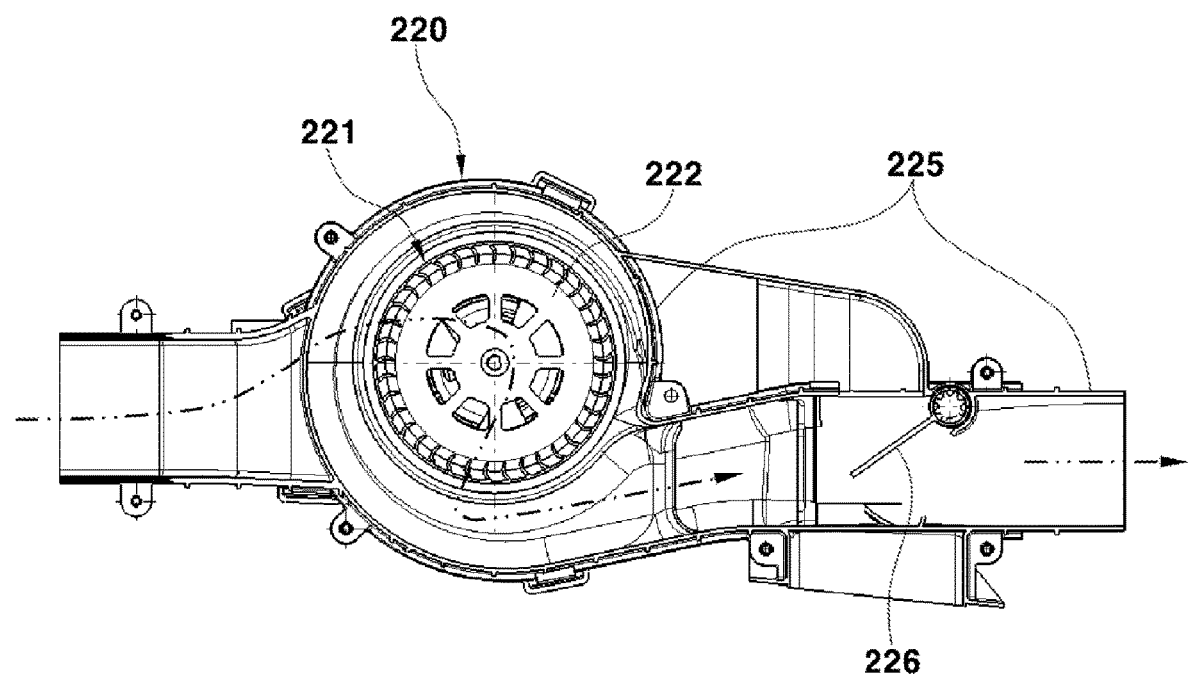
FIG. 11 is a side view exemplarily illustrating the flow state of the air passing through the rear seat blower unit and the state in which the air volume is controlled by the air volume control door according to an exemplary embodiment of the present disclosure.

Next, FIG. 10 is a perspective view exemplarily illustrating a rear seat blower unit according to an exemplary embodiment of the present disclosure. In FIG. 10, to show the internal configuration of the rear seat blower unit 220, the blower casing 225 is shown transparently so that only the external shape and the external contour are visible. FIG. 11 is a side view exemplarily illustrating a state in which a volume of air passing through the rear seat blower unit 220 is controlled by the air volume control door 226 according to an exemplary embodiment of the present disclosure.

The blower casing 225 of the rear seat blower unit 220 is configured as both a casing housing blower fans 222 and 223 of the rear seat blower 221, and a passage of air supplied from the front seat HVAC 100 to the rear seat, together with the front console vent duct 211 and the rear console vent duct 212.

In the rear seat air outlet 106 of the front seat HVAC 100, after having passed through the left and right flow paths, which are divided by the flow guide 163, the separator 150, the partition wall, and the like in the internal space of the air conditioning casing 101, the air is discharged separately from each other. To the present end, the internal passage of the rear seat air outlet 106 of the air conditioning casing 101 may be divided into two passages, or may be divided into a left flow path and a right flow path by the partition wall as described above.

Furthermore, the separately discharged air after passing through the left and right flow paths flows in a separated state also in the console vent duct 210 and the rear seat blower unit 220. To the present end, the console vent duct 210 and the blower casing 225 of the rear seat blower unit 220 also have two separate left and right passages, i.e., the left passage and the right passage, so that the left and right air flows may be maintained in a completely separated state.

For example, the console vent duct 210, that is, the front console vent duct 211 and the rear console vent duct 212, may include two ducts in parallel, or may be provided in a single duct with a partition wall to divide the internal passage thereof in a longitudinal direction (duct length direction, air flow direction).

At the present time, the blower casing 225 of the rear seat blower unit 220 connected between the front console vent duct 211 and the rear console vent duct 212 also includes two separate passages, namely, the left passage and the right passage.

The blower casing 225 may also include two ducts in parallel, or may be provided in a single duct with a partition wall to divide the internal passage thereof in a longitudinal direction (duct length direction, air flow direction).

Of course, the rear seat air outlet 106 of the air conditioning casing 101, the front seat console vent duct 210, the blower casing 225, and the rear seat console vent duct 210 are connected to each other so that their left passages (left flow paths) communicate with each other and their right passages (right flow paths) communicate with each other. At the instant time, the air is allowed to flow into the left space of the vehicle rear seat through the left passage and to flow into the right space of the vehicle rear seat through the right passage.

Meanwhile, in the present disclosure, the rear seat blower 221 of the rear seat blower unit 220 may have a dual fan type configuration in which two blower fans 222 and 223 are mounted on one blower motor 224. In the present dual fan type configuration, the two blower fans 222 and 223 are disposed one by one in the left passage and the right passage of the blower casing 225. At the instant time, the blower motor 224 may be disposed between the two passages on the left and right sides.

Furthermore, air volume control doors 226 are respectively provided at a position on the downstream side of the blower fans 222 and 223 in the left passage and the right passage of the blower casing 225 to regulate the air volume in the corresponding passage. At the instant time, the air volume control door 226 in the left passage and the air volume control door 226 in the right passage are respectively connected to separate door actuators so that the two air volume control doors 226 on both sides are operated independently by the respective door actuators.

As a result, because the operation of the two air volume control doors 226 is independently controlled by the door actuator, the opening amount of the left passage and the right passage may be individually controlled, and the air volume of the left passage and the right passage can also be independently controlled.

Accordingly, the air amount conditioning air discharged into the left and right spaces of the rear seat space of the vehicle interior may be individually controlled, and consequently independent air conditioning control for 2-zone of the rear seat may be implemented so that the air volume and temperature of the rear seat may be individually controlled for the left and right spaces of the rear seat. Furthermore, because independent air conditioning control for 2-zone may be implemented for the rear seat as well as the front seat, independent air conditioning control for 4-zone may be implemented for the entire vehicle interior space.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A vehicle air conditioning system configured for performing individual air conditioning in four zones for left and right spaces of a front seat and left and right spaces of a rear seat in a vehicle interior, the air conditioning system comprising:
    a front seat heating, ventilation, and air conditioner (HVAC) separately supplying air that has passed through left and right flow paths of a front seat flow path in an air conditioning casing into the left and right spaces of the front seat to perform two-zone individual air conditioning for the front seat,
    wherein a flow guide is provided in an upstream side space of an evaporator in an internal space of the air conditioning casing of the front seat HVAC to divide the upstream side space of the evaporator to have a left flow path and a right flow path,
    wherein the flow guide and a side portion of the air conditioning casing opposite to the flow guide have a curved stepped portion in cross-section,
    wherein the flow guide is disposed along a space between the side portion of the air conditioning casing and a front portion of the evaporator, and
    wherein a spaced interval between the stepped portion of the side portion of the air conditioning casing and the stepped portion of the flow guide is a same as a spaced interval between the stepped portion of the flow guide and the front portion of the evaporator.

2. The vehicle air conditioning system of claim 1, wherein the stepped portion of the side portion of the air conditioning casing and the stepped portion of the flow guide have a same stepped curved shape in cross-section.

3. The vehicle air conditioning system of claim 1,
    wherein the flow guide is disposed along a space between the side portion of the air conditioning casing and the front portion of the evaporator, and
    wherein cross-sectional areas of the left and right flow paths divided by the flow guide in the space between the side portion of the air conditioning casing and the front portion of the evaporator have a same size.

4. The vehicle air conditioning system of claim 1, wherein an air volume control door is provided in a space from an air inlet, through which air blown by an air conditioning blower is introduced, to the flow guide in the air conditioning casing to control a volume of the air distributed into the left flow path and the right flow path divided by the flow guide.

5. The vehicle air conditioning system of claim 4,
wherein a shaft portion is formed along an end portion of the air volume control door,
wherein the flow guide is provided with a shaft coupling portion to which the shaft portion of the air volume control door is rotatably hinge-coupled, and
wherein the air volume control door is rotated around the shaft portion and the shaft coupling portion by a door actuator.

6. The vehicle air conditioning system of claim 5, wherein the flow guide is fixed on a downstream side of the air volume control door in the internal space of the air conditioning casing to divide a space from the shaft portion of the air volume control door to the evaporator into a left space and a right space.

7. The vehicle air conditioning system of claim 1, wherein a separator is provided in the internal space of the air conditioning casing to divide a downstream side space of the evaporator into a left flow path and a right flow path so that the air distributed by the flow guide passes through the evaporator and then flows separately through the left flow path and the right flow path divided by the separator.

8. The vehicle air conditioning system of claim 1, further including:
a rear seat extension duct provided to separately supply air having passed through left and right flow paths of a rear seat flow path in the air conditioning casing of the front seat HVAC to the rear seat;
a rear seat blower unit provided in a middle portion of the rear seat extension duct to draw air that has passed through the left and right flow paths of the rear seat flow path in the air conditioning casing through the rear seat extension duct, and then blow the drawn in air; and
a vent duct provided to extend left and right from the rear seat extension duct to separately supply air blown by the rear seat blower unit into the left and right spaces of the rear seat.

9. The vehicle air conditioning system of claim 8, wherein the rear seat extension duct and a blower casing of the rear seat blower unit have a left flow path and a right flow path, through which air having passed through the left flow path and the right flow path of the rear seat flow path flows separately.

10. The vehicle air conditioning system of claim 9, wherein a rear seat blower of the rear seat blower unit includes:
a blower motor; and
a total of two blower fans disposed one by one in a left passage and a right passage of the blower casing to rotate with rotation force from the blower motor.

11. The vehicle air conditioning system of claim 10, wherein an air volume control door is provided in the left passage and the right passage of the blower casing at a position downstream of respective blower fans to control an air volume in a corresponding passage.

\* \* \* \* \*